United States Patent
Tomoda et al.

(10) Patent No.: US 11,815,158 B2
(45) Date of Patent: Nov. 14, 2023

(54) CORE WIRE FOR FRICTION TRANSMISSION BELTS, FRICTION TRANSMISSION BELT, AND MANUFACTURING METHODS THEREFOR

(71) Applicant: Mitsuboshi Belting Ltd., Kobe (JP)

(72) Inventors: Takuya Tomoda, Hyogo (JP); Takeshi Nishiyama, Hyogo (JP); Masashi Tamura, Hyogo (JP); Tomomitsu Kurokawa, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 445 days.

(21) Appl. No.: 17/270,666

(22) PCT Filed: Aug. 19, 2019

(86) PCT No.: PCT/JP2019/032328
§ 371 (c)(1),
(2) Date: Feb. 23, 2021

(87) PCT Pub. No.: WO2020/040101
PCT Pub. Date: Feb. 27, 2020

(65) Prior Publication Data
US 2021/0222755 A1 Jul. 22, 2021

(30) Foreign Application Priority Data

Aug. 23, 2018 (JP) .................................. 2018-156249
Jul. 23, 2019 (JP) .................................. 2019-135145

(51) Int. Cl.
*F16G 1/10* (2006.01)
*B29D 29/10* (2006.01)
(Continued)

(52) U.S. Cl.
CPC ............... *F16G 1/10* (2013.01); *B29D 29/10* (2013.01); *D02G 3/16* (2013.01); *D02G 3/28* (2013.01);
(Continued)

(58) Field of Classification Search
CPC ...... F16G 1/08; F16G 5/06; F16G 5/00; F16G 5/20; F16G 1/10; F16G 5/08; F16G 5/04;
(Continued)

(56) References Cited

U.S. PATENT DOCUMENTS 4,214,488 A * 7/1980 Conrad ..................... F16G 1/28
474/154
7,682,274 B2 * 3/2010 Akiyama .................. F16G 1/28
428/377
(Continued)

FOREIGN PATENT DOCUMENTS

JP S61-192943 A 8/1986
JP H05-060178 A 3/1993
(Continued)

OTHER PUBLICATIONS

Oct. 21, 2019—International Search Report—Intl App PCT/JP2019/032328.
(Continued)

*Primary Examiner* — Henry Y Liu
(74) *Attorney, Agent, or Firm* — Banner & Witcoff, Ltd.

(57) ABSTRACT

The present invention relates to a core wire for a frictional power-transmission belt, the core wire including a Lang lay cord, having a total fineness of 300 to 1000 tex, and including a rubber component adhered to at least a part of a surface of the core wire, in which the Lang lay cord comprises a first-twisted yarn, and in which the first-twisted yarn comprises a carbon fiber.

8 Claims, 2 Drawing Sheets

(51) Int. Cl.
*D02G 3/16* (2006.01)
*D02G 3/28* (2006.01)
*D02G 3/44* (2006.01)
*F16G 5/08* (2006.01)
*F16G 5/20* (2006.01)

(52) U.S. Cl.
CPC ............... *D02G 3/447* (2013.01); *F16G 5/08* (2013.01); *F16G 5/20* (2013.01)

(58) Field of Classification Search
CPC ........... D02G 3/447; D02G 3/16; D02G 3/28; D02G 3/26
USPC ........................................................ 474/238
See application file for complete search history.

(56) References Cited

U.S. PATENT DOCUMENTS

| | | | | |
|---|---|---|---|---|
| 2002/0132692 A1* | 9/2002 | Knutson | ................ | D02G 3/447 474/263 |
| 2003/0130077 A1* | 7/2003 | Knutson | ................... | F16G 1/08 474/263 |
| 2004/0132571 A1 | 7/2004 | Knutson | | |
| 2012/0309573 A1* | 12/2012 | Well | ........... | F16G 1/10 474/205 |
| 2013/0217528 A1* | 8/2013 | Matsumoto | ............... | F16G 1/10 427/407.1 |
| 2015/0024892 A1* | 1/2015 | Hineno | ..................... | F16G 5/08 474/237 |
| 2015/0111677 A1* | 4/2015 | Nishiyama | ................ | F16G 5/08 474/264 |
| 2015/0148165 A1* | 5/2015 | Matsuda | ................... | F16G 1/21 474/264 |
| 2015/0285335 A1* | 10/2015 | Mitsutomi | ................ | F16G 5/06 156/137 |
| 2015/0369335 A1* | 12/2015 | Ishiguro | .................... | C08L 7/00 474/260 |
| 2016/0208889 A1* | 7/2016 | Yoshida | ................ | B32B 5/02 |
| 2016/0273616 A1* | 9/2016 | Takehara | ................. | F16G 1/00 |
| 2018/0223953 A1* | 8/2018 | Harada | ..................... | B32B 3/30 |

FOREIGN PATENT DOCUMENTS

| | | |
|---|---|---|
| JP | H05-312237 A | 11/1993 |
| JP | 2004-535517 A | 11/2004 |
| JP | 2005-256961 A | 9/2005 |
| JP | 2010-096229 A | 4/2010 |
| JP | 2015-064103 A | 4/2015 |
| WO | 2004/057209 A1 | 7/2004 |
| WO | 2017-057202 A1 | 4/2017 |

OTHER PUBLICATIONS

Mar. 31, 2022—(EP) Extended EP Search Report—App 19851809.4.

May 19, 2022—(KR) Office Action—App. 10-2021-7005201, Eng. Tran.

Jun. 1, 2022—(CN) Office Action—App. 201980055064.2, Eng. Tran.

* cited by examiner

CORE WIRE FOR FRICTION TRANSMISSION BELTS, FRICTION TRANSMISSION BELT, AND MANUFACTURING METHODS THEREFOR

CROSS REFERENCE TO RELATED APPLICATIONS

This is a U.S. National Phase Application under 35 U.S.C. § 371 of International Application No. PCT/JP2019/032328, filed Aug. 19, 2019, which claims priority to Japanese Application Nos. 2018-156249, filed Aug. 23, 2018, and 2019-135145, filed Jul. 23, 2019, which was published Under PCT Article 21(2), the entire contents of which are incorporated herein by reference.

TECHNICAL FIELD

The present invention relates to a core wire for a frictional power-transmission belt, which is a Lang lay cord of a carbon fiber, and a frictional power-transmission belt including the core wire, and relates to methods of manufacturing them.

BACKGROUND ART

Recently, regulations on fuel efficiency of automobiles have been tightened. In such a situation, more vehicles have been mounted with idling stop mechanisms as one of improvement measures of fuel efficiency of engines. A belt-type ISG (Integrated Starter Generator) drive which drives a crankshaft by an alternator through an accessory driving belt such as a V-ribbed belt is widely used for restarting an engine in an idling stop state. In the belt-type ISG drive, dynamic tension higher than that in a normal engine mounted with no ISG is generated in the accessory driving belt. For example, in the case where the dynamic tension generated in an accessory driving belt in an engine mounted with no ISG is about 70 N/mm with respect to a belt width of 1 mm, a dynamic tension of about 100 N/mm is generated in an accessory driving belt in an engine mounted with a belt-type ISG drive. Therefore, an accessory driving belt for use in an engine mounted with a belt-type ISG drive is required to have a tensile elastic modulus high enough to keep the elongation of the belt small even when high dynamic tension is generated. Conventionally, a twisted cord including a fiber having a comparatively high elastic modulus, such as a polyester fiber or an aramid fiber, has been used as a core wire of a V-ribbed belt for use in accessory drive. However, continuous increase in dynamic tension has led to insufficiency of the conventional elastic modulus. In order to cope with high dynamic tension, it is also considered to take a measure of increasing the number of ribs (increase the width of the belt). However, when the number of ribs is increased, the pulley width is also increased unfavorably from the viewpoint of space saving and weight reduction. That is, it is requested to provide a V-ribbed belt which has high durability in spite of a small number of ribs owing to the enhanced tensile elastic modulus of the belt.

In response to such a request, JP-A-S61-192943 (Patent Literature 1) discloses a power-transmission belt using a twisted-yarn cord of a carbon fiber as a tensile body. This literature discloses that the use of the twisted-yarn cord of a carbon fiber improves bending fatigue resistance and reduces elongation of the belt during running.

However, this literature only defines, as an improvement means for properties of the belt, a means of adjusting the twisted-yarn cord to have a second-twist coefficient of 2 to 4 and subjecting the cord to a Resorcin-Formalin-Latex (RFL) treatment. Therefore, it is hard to say that the belt in Patent Literature 1 is sufficiently optimized with respect to the performance required for the V-ribbed belt for use in an accessory drive.

In addition, JP-T-2004-535517 (Patent Literature 2) discloses, as a power-transmission belt having improved elongation resistance, a belt including a tension member of a spiral cord including a yarn made of a carbon fiber having a tensile elastic modulus within a range of about 50 to 350 GPa. This literature discloses a V-belt, a multi-ribbed belt and a toothed power-transmission belt as the power-transmission belt, and discloses, in Examples, that the toothed power-transmission belt is manufactured using a carbon fiber cord including two carbon fiber yarns having 396 tex (two carbon fiber yarns twisted together).

However, in this literature, a V-ribbed belt is not specifically studied, and the toothed power-transmission belt that is specifically studied has a power transmission mechanism greatly different from that of the V-ribbed belt. In addition, in this literature, although the tensile elastic modulus of the carbon fiber or the twisted cord is specified, the tensile elastic modulus of the belt is not specified at all and cannot be estimated from the description of the specification. Although materials or cords with a high tensile elastic modulus are used, other factors are intricately involved. For example, if the number of cords in the belt is small, the tensile elastic modulus of the belt is low as a result, and thus there is a concern that the belt cannot be used for applications with high dynamic tension. The important thing is a tensile elastic modulus of the belt, and defining only the tensile elastic modulus of the carbon fiber or the twisted cord is not sufficient for specifying an invention for applications with high dynamic tension. In addition, the method of twisting the cord and the number of twists are not sufficiently studied.

CITATION LIST

Patent Literature

Patent Literature 1: JP-A-S61-192943 (Claims)
Patent Literature 2: JP-T-2004-535517 (Claim 1 and Paragraph [0005])

SUMMARY OF INVENTION

Technical Problem

Therefore, an object of the present invention is to provide a core wire for a frictional power-transmission belt which enables manufacturing of a frictional power-transmission belt capable of transmitting power with a narrow width of the belt and excellent in durability even in applications where high dynamic tension is generated, such as an engine mounted with a belt-type ISG drive, a frictional power-transmission belt including the core wire, and methods of manufacturing them.

Another object of the present invention is to provide a core wire for a frictional power-transmission belt which enables manufacturing of a V-ribbed belt having high durability in spite of a small number of ribs, a frictional power-transmission belt including the core wire, and methods of manufacturing them.

Solution to Problem

The present inventors have made intensive studies in order to attain the foregoing objects. As a result, the present inventors have found that when a core wire adjusted to have a total fineness of 300 to 1000 tex and formed of a Lang lay cord of a carbon fiber with a rubber component adhered to the surface thereof is used for a frictional power-transmission belt, power can be transmitted with a narrow width of the belt and durability can also be improved even in applications where high dynamic tension is generated, such as an engine mounted with a belt-type ISG drive. Thus, the present inventors have completed the present invention.

That is, a core wire for a frictional power-transmission belt of the present invention includes a Lang lay cord and has a total fineness of 300 to 1000 tex. The frictional power-transmission belt includes a rubber component adhered to at least a part of a surface of the core wire. The Lang lay cord includes a first-twisted yarn, and the first-twisted yarn includes a carbon fiber. The first-twisted yarn may have a fineness of 190 to 410 tex and a twist coefficient of 0.5 to 2. The Lang lay cord may have two to three first-twisted yarns. The core wire may have a core wire diameter of 0.7 to 1.2 mm. In the core wire, a second-twist coefficient may be 1 to 7 times a first-twist coefficient. The core wire may further include an adhesive component present between single fibers constituting the first-twisted yarn. An adhesion rate of the adhesive component in the first-twisted yarn may be 10 to 25 mass % with respect to a raw yarn.

The present invention also relates to a method of manufacturing the core wire for a frictional power-transmission belt, including a second-twisting step of combining and twisting a plurality of the first-twisted yarns. The manufacturing method may further include, as a step before the second-twisting step, an adhesive component adhesion step of adhering the adhesive component to the raw yarn for forming the first-twisted yarn and a first-twisting step of first-twisting the raw yarn to which the adhesive component is adhered.

The present invention also relates to a frictional power-transmission belt including the core wire. The frictional power-transmission belt may include a rubber layer in which a plurality of the core wires are embedded at predetermined intervals, the plurality of the core wires may be the core wires that are the above Lang lay cords, and may include an S-twisted Lang lay cord and a Z-twisted Lang lay cord. The frictional power-transmission belt may be a V-ribbed belt. The frictional power-transmission belt may have a tensile elastic modulus of 240 to 500 N/(mm·%). The frictional power-transmission belt may be a belt to be installed on an engine mounted with a belt-type ISG drive in which a dynamic tension of 85 N/mm or more is applied to the belt per 1 mm of a width thereof.

The present invention also relates to a method of manufacturing a frictional power-transmission belt, which includes: a step of forming a rubber sheet into a predetermined shape, the rubber sheet being formed of an unvulcanized rubber composition and including a core wire embedded therein; and a step of vulcanizing a formed body thus formed. As the core wire, the core wire which is the above Lang lay cord is used.

Advantageous Effects of Invention

In the present invention, since the Lang lay cord including the carbon fiber and the rubber component adhered to the surface of the core wire and having a total fineness of 300 to 1000 tex is used as the core wire for a frictional power-transmission belt, power can be transmitted with a narrow width of the belt and durability can be improved even in applications where high dynamic tension is generated, such as an engine mounted with a belt-type ISG drive. Therefore, when the core wire of the present invention is used as the core wire for the V-ribbed belt, the durability can be improved even with a small number of ribs.

DESCRIPTION OF EMBODIMENTS

[Core Wire for Frictional Power-Transmission Belt]

The core wire of the present invention is used as a core wire for a frictional power-transmission belt, and includes a Lang lay cord obtained by performing second-twisting in a direction same as a twisting direction of a first-twisted yarn including a carbon fiber. In the present invention, since the first-twisted yarn of the Lang lay cord includes a carbon fiber, the elastic modulus of the core wire can be improved.

(Carbon Fiber)

Examples of the carbon fiber as a raw yarn constituting the Lang lay cord include a pitch-based carbon fiber, a polyacrylonitrile (PAN)-based carbon fiber, a phenolic resin-based carbon fiber, a cellulose-based carbon fiber, and a polyvinyl alcohol-based carbon fiber. As commercial products of the carbon fiber, for example, "TORAYCA (registered trademark)" manufactured by Toray Industries, Inc., "TENAX (registered trademark)" manufactured by Toho Tenax Co., Ltd., "DIALEAD (registered trademark)" manufactured by Mitsubishi Chemical Corporation, etc. can be used. Each of those carbon fibers may be used alone, or two or more kinds of them may be used in combination. Of those carbon fibers, the pitch-based carbon fiber and the PAN-based carbon fiber are preferred, and the PAN-based carbon fiber is particularly preferred.

The carbon fiber as a raw yarn is generally a carbon multifilament yarn including monofilaments yarn of the carbon fiber. Any carbon multifilament yarn (i.e., a raw yarn for forming a first-twisted yarn) can be used as long as it includes monofilament yarns of the carbon fiber. If necessary, the carbon multifilament yarn may include monofilament yarns of fibers other than the carbon fiber (for example, an inorganic fiber such as a glass fiber, or an organic fiber such as an aramid fiber). The proportion of the carbon fiber may be, for example, 50 mass % or more (50 to 100 mass %), preferably 80 mass % or more, and more preferably 90 mass % or more in the total of the monofilament yarns (multifilament yarn). Generally, the proportion of the carbon fiber is 100 mass % in the total of the monofilament yarns (multifilament yarn), and all the monofilament yarns are composed of the carbon fiber. When the proportion of the carbon fiber is too low, there is a concern that the elongation of the belt increases, and if high dynamic tension is generated, the durability deteriorates.

Any multifilament yarn can be used as long as it includes a plurality of monofilament yarns. For example, the multifilament yarn may include about 100 to 50,000 monofilament yarns, preferably about 1,000 to 30,000 (e.g., 2,000 to 20,000) monofilament yarns, and more preferably about 3,000 to 15,000 (particularly 4,000 to 10,000) monofilament yarns. The average fineness of the monofilament yarns may be, for example, about 0.1 to 5 dtex, preferably about 0.3 to 3 dtex, and more preferably about 0.5 to 1 dtex.

The fineness of the multifilament yarn may be, for example, about 100 to 1,000 tex, preferably about 150 to 800 tex (e.g., 180 to 500 tex), and more preferably about 190 to 410 tex (particularly 300 to 410 tex). The fineness of the multifilament yarn may be the fineness of a first-twisted yarn obtained by first-twisting the multifilament yarn.

The tensile elastic modulus of the carbon fiber (carbon fiber before twisting) as a raw yarn is, for example, about 200 to 900 GPa, preferably about 200 to 800 GPa, and more preferably about 210 to 500 GPa (particularly 220 to 300 GPa). When the tensile elastic modulus of the carbon fiber is too low, there is a concern that the elongation of the belt increases to increase slippage, causing failure in power transmission, occurrence of abnormal sound, and deterioration in durability due to heat generation. On the contrary, when the tensile elastic modulus of the carbon fiber is too high, there is a concern that fluctuation of tension in the belt increases to lower the durability.

In the present description, the tensile elastic modulus of a fiber can be measured with a method in which a load-elongation curve is measured by a method according to JIS L 1013 (2010) and an average inclination in a region of a load of 1,000 MPa or less is obtained.

The tensile strength of the carbon fiber as a raw yarn is, for example, about 2,000 to 7,000 MPa, preferably about 2,500 to 6,500 MPa, and more preferably about 3,000 to 6,000 MPa (particularly 4,000 to 5,000 MPa). When the tensile strength of the carbon fiber is too low, there is a concern that the belt breaks under high dynamic tension, and when the tensile strength of the carbon fiber is too high, there is a concern that the bending fatigue resistance deteriorates.

In the present description, the tensile strength is measured by the method described in JIS L1013 (2010). As described in this standard, when measuring the tensile strength of a non-twisted multifilament, measurement is performed by conducting twisting 8 times per 10 cm.

(Properties of Core Wire)

The average wire diameter (core wire diameter) of the core wire is, for example, about 0.7 to 1.2 mm (e.g., 0.8 to 1.1 mm), preferably about 0.8 to 1.18 mm (e.g., 0.9 to 1.16 mm) and more preferably about 1.05 to 1.15 mm (particularly 1.08 to 1.12 mm). When the core wire diameter is too small, there is a concern that the belt strength is reduced, and when the core wire diameter is too large, there is a concern that the bending fatigue resistance and pop-out resistance deteriorate. In the present description, the average wire diameter (core wire diameter) of the core wire in the belt is obtained by photographing a cross section of the core wire in the belt width direction with a scanning electron microscope (SEM) or observing the same with a projector, to measure the length of the core wire in the belt width direction at arbitrary 10 points and obtain an average value thereof. When the number of core wires included in the belt is too small to measure the length at 10 points, the average value of all measurable portions is taken as the core wire diameter.

The total fineness of the core wire (Lang lay cord of the carbon fiber) can be selected from the range of about 300 to 1,000 tex according to the desired core wire diameter, and is preferably about 350 to 900 tex. Particularly in applications where large dynamic tension is generated, the total fineness of the core wire may be, for example, about 500 to 1,000 tex, preferably about 600 to 950 tex, and more preferably about 700 to 900 tex (particularly 750 to 850 tex). When the total fineness of the core wire is adjusted to such a range, the core wire diameter can be controlled in an appropriate range, and the tensile elastic modulus of the belt can be sufficiently increased. When the total fineness is too small, the belt strength is reduced, and when the total fineness is too large, the bending fatigue resistance and pop-out resistance deteriorate.

The Lang lay cord forming the core wire is a Lang lay cord obtained by collecting and twisting a plurality of first-twisted yarns in a direction same as first-twisting. In the present invention, since the carbon fibers are twisted by Lang lay, the bending fatigue resistance can be improved. The first-twisted yarn forming the Lang lay cord may be a single-twisted yarn obtained by aligning a plurality of carbon fiber filaments (multifilament yarn or the like) which are raw yarns and then twisting the same in one direction. As the Lang lay cord, a Lang lay cord of any of an S-twisted Lang lay yarn in which both a first-twist and a second-twist are S twists and a Z-twisted Lang lay yarn in which both a first-twist and a second-twist are Z twists can be used.

The Lang lay cord is formed by twisting a plurality of first-twisted yarns, and the number of the first-twisted yarns is 2 or more. Generally, the number of the first-twisted yarns is about 2 to 5, preferably 2 to 4 from the viewpoint of the durability of the belt, and more preferably 2 to 3 (particularly 2) from the viewpoints of simplicity and productivity. The fineness of each first-twisted yarn can be selected from the range same as the above-described fineness of the multifilament yarn.

The number of twists of the first-twisted yarn (the number of rotations of the yarn per 1 m of length) is, for example, about 10 to 150 twists/m, preferably about 20 to 100 twists/m, and more preferably about 22 to 50 twists/m (particularly 25 to 40 twists/m). When the number of first-twists is too low, there is a concern that the bending fatigue resistance deteriorates, and when the number of first-twists is too high, there is a concern that the belt strength and elastic modulus deteriorate.

The twist coefficient of the first-twisted yarn (first-twist coefficient) is, for example, about 0.3 to 2.5, preferably about 0.5 to 2, and more preferably about 0.6 to 1.5 (particularly 0.65 to 1). When the first-twist coefficient is too low, there is a concern that the bending fatigue resistance deteriorates, and when the first-twist coefficient is too high, there is a concern that the belt strength and elastic modulus deteriorate.

The twist coefficient is a value that substitutes for the angle formed by the fiber with respect to the longitudinal direction of the core wire, and is an index for comparing the twisting strength of twisted yarns having different fineness. The larger the twist coefficient is, the larger the angle formed by the fiber with respect to the longitudinal direction of the core wire is, and the stronger the twist is. In the present description, in consideration of the specific gravity of the carbon fiber, the twist coefficient is calculated based on the following equation.

$$\text{Twist coefficient}=[\text{number of twists (twists/}m)\times\sqrt{\text{fineness (tex)}}]/850.$$

The number of twists (the number of second-twists) of the Lang lay cord (second-twisted yarn) is, for example, about 50 to 200 twists/m preferably about 70 to 150 twists/m, and more preferably about 72 to 100 twists/m (particularly 75 to 90 twists/m). When the number of second-twists is too low, there is a concern that the bending fatigue resistance deteriorates, and when the number of second-twists is too high, there is a concern that the belt strength and elastic modulus deteriorate.

The twist coefficient (second-twist coefficient) of the Lang lay cord (second-twisted yarn) is, for example, about 1 to 5, preferably about 1.5 to 4, and more preferably about 1.8 to 3.5 (particularly 2 to 3). When the second-twist coefficient is too low, there is a concern that the bending fatigue resistance deteriorates, and when the second-twist coefficient is too high, there is a concern that the belt strength and elastic modulus deteriorate.

In the Lang lay cord, the second-twist coefficient may be in the range of, for example, about 0.5 to 10 times the first-twist coefficient, and is preferably about 1 to 7 times, more preferably about 3 to 6.5 times, still more preferably about 3.5 to 6 times, and most preferably about 4.5 to 5.5 times the first-twist coefficient. When the second-twist coefficient is too lower than the first-twist coefficient, there is a concern that the bending fatigue resistance deteriorates, and when the second-twist coefficient is too higher than the first-twist coefficient, there is a concern that the belt strength deteriorates.

The core wire includes the Lang lay cord and may include other twisted cords within a range which does not impair the effect of the present invention. The proportion of the Lang lay cord may be, for example, 50 mass % or more, preferably 80 mass % or more, and more preferably 90 mass % or more in the core wire. Among them, it is most preferable that the core wire is a core wire made of the Lang lay cord.

(Adhesion Treatment)

The core wire (Lang lay cord) may be subjected to an adhesion treatment (or surface treatment) used commonly, and may be treated with a treatment liquid containing an adhesive component, for example, a resorcin-formalin-latex (RFL) liquid, or a treatment liquid containing a polyisocyanate compound or a bismaleimide compound. When the adhesive component permeates between fibers of single fibers constituting the first-twisted yarn and the adhesive component is adhered to the surface of staple fibers, the converging property between fibers is improved, the core wire exposed from a width cut cross-section of the belt can be prevented from fraying and thus the durability can be improved.

Further, the core wire is covered with a rubber composition containing a rubber component constituting an adhesion rubber layer to be described later by being subjected to an overcoat treatment with the rubber composition. When the rubber component is adhered to the surface of the core wire, the adhesive property between the core wire and the rubber can be further enhanced, the effect of relaxing against shear stress can be enhanced, and the durability of the belt can be improved.

The adhesion treatment may be performed on the raw yarn before twisting, or may be performed on the twisted yarn (first-twisted yarn second-twisted yarn) which has been twisted. When the adhesion treatment is performed on the raw yarn, the adhesion treatment liquid (adhesive component) easily permeates between the fibers, and thus the adhesive force between the fibers can be improved. However, there is a concern that the yarn subjected to the adhesion treatment in the state of the raw yarn has reduced workability in the subsequent operation for twisting. On the other hand, when the adhesion treatment is performed on the twisted yarn which has been twisted, the workability is good, but there is a concern that the adhesion treatment liquid become hard to permeate between the fibers and the adhesive force between the fibers is not sufficiently improved. Of these, it is preferable that the first-twisted yarn is subjected to the adhesion treatment before being twisted, and the adhesive component is present between single fibers constituting the first-twisted yarn, from the viewpoint of bending fatigue resistance. Further, it is particularly preferable to cover the Lang lay cord, obtained by twisting the first-twisted yarn in which the adhesive component is present between the single fibers, with the rubber composition to adhere the rubber component to at least a part of the surface of the core wire.

When the first-twisted yarn is subjected to the adhesion treatment, the adhesion rate (solid content adhesion rate) of the adhesive component is, for example, about 10 to 25 mass %, preferably about 12 to 23 mass %, and more preferably about 15 to 22 mass % (particularly 16 to 20 mass %), with respect to the raw yarn. When the proportion of the adhesive component is too small, there is a concern that insufficient adhesion between single fibers causes rubbing between fibers during bending, resulting in deteriorated bending fatigue resistance; and when the proportion of the adhesive component is too large, the core wire diameter becomes too large, so that there is a concern that the number of core wires in the belt is reduced and thus the elastic modulus and the belt strength are reduced.

In the present invention, the adhesion rate (solid content adhesion rate) of the adhesive component adhered to the fiber can be changed by changing the solid content concentration of the adhesion treatment liquid or by changing the number of times of the adhesion treatment. In the present description, the solid content adhesion rate is calculated based on the following equation.

Solid content adhesion rate (%)=[(weight of adhesion-treated yarn−weight of untreated yarn)/weight of untreated yarn]×100

When the Lang lay cord is covered with the rubber composition, the coverage of the surface of the Lang lay cord with the rubber component may be 50% or more, preferably 80% or more, more preferably 90% or more, and most preferably 100% (the entire surface of the Lang lay cord is covered).

The core wire for frictional power-transmission belt of the present invention is obtained through a second-twisting step of bundling and second-twisting a plurality of first-twisted yarns. When the first-twisted yarn before twisting is subjected to the adhesion treatment, an adhesive component adhesion step of adhering the adhesive component to the raw yarn for forming the first-twisted yarn and a first-twisting step of first-twisting the raw yarn adhered with the adhesive component may be included as a step before the second-twisting step.

[Frictional Power-Transmission Belt]

The frictional power-transmission belt of the present invention includes, as the core wire, the Lang lay cord of a carbon fiber. In the present invention, by using the Lang lay cord of a carbon fiber having a high tensile elastic modulus as the core wire, the elongation of the belt can be reduced even when high dynamic tension is generated and the durability can be improved.

Examples of the frictional power-transmission belt include a flat belt and a V-belt (such as a wrapped V-belt, a raw-edge V-belt, a raw-edge cogged V-belt, and a V-ribbed belt). Of these, the V-ribbed belt is preferred in applications where high dynamic tension is generated. In the V-ribbed belt, by using the Lang lay cord of a carbon fiber having a high tensile elastic modulus as the core wire, a small number of ribs can be applied.

(Core Wire Pitch)

A plurality of core wires may be embedded in the frictional power-transmission belt such as a V-ribbed belt (e.g., in a rubber layer such as an adhesion rubber layer to be described later). The plurality of core wires may be disposed to extend in the longitudinal direction of the belt, and to be separated from one another at a predetermined pitch in the belt width direction.

The core wire pitch (distance between centers of two adjacent core wires in the belt) in the frictional power-transmission belt is preferably small because it can increase the tensile strength and the tensile elastic modulus of the belt. However, when the core wire pitch is too small, there may arise a problem that the core wire tends to ride on the core wire adjacent thereto or the rubber is less likely to flow between the core wires to thereby reduce the adhesive force. In addition, there is a concern that the core wires come into contact with each other and rub each other when the belt is bent, thereby deteriorating the bending fatigue resistance. Further, there is a concern that the core wires adjacent to each other overlap each other and the workability is reduced when the core wires are spirally spun and wound. Therefore, the core wire pitch may be equal to or larger than the core wire diameter, and a value slightly larger than the core wire diameter is desirable from the viewpoint of improving the workability.

The core wire pitch can be selected from a range, for example, about 0.01 to 1 mm larger than the core wire diameter. The core wire pitch may be about 0.03 to 0.5 mm (e.g., 0.04 to 0.3 mm) larger than the core wire diameter, and more preferably about 0.05 to 0.2 mm (particularly 0.08 to 0.15 mm) larger than the core wire diameter. Specifically, the core wire pitch is, for example, about 0.5 to 2 mm, preferably about 0.7 to 1.7 mm, and more preferably about 0.8 to 1.5 mm (particularly, 1 to 1.3 mm). When the core wire pitch is too small, there may arise a problem that the core wires rub on one another to reduce the belt strength when the belt is bent, or the core wire rides on one another when the belt is manufactured. On the contrary, when the core wire pitch is too large, there is a concern that the tensile elastic modulus of the belt is reduced even when a carbon fiber high in tensile elastic modulus is used.

In the present description, the core wire pitch (average pitch) is obtained by photographing the cross section of the core wire in the belt width direction with an SEM or observing the same with a projector, and measuring the distance between centers of the core wires at arbitrary 10 points to obtain an average value. When the number of core wires included in the belt is too small to measure at 10 points, the average value of all measurable portions is taken as the core wire pitch.

As for the plurality of core wires, core wires second-twisted in the same direction (for example, S-twisted cords which has been second-twisted in an S direction or Z-twisted cords which has been second-twisted in a Z direction) may be buried at a predetermined interval (or at a predetermined pitch), or S-twisted cords and Z-twisted cords may be combined and buried. For example, the S-twisted cords and the Z-twisted cords may be buried regularly at every predetermined interval (for example, at every equal interval) or buried irregularly. Generally, the S-twisted cords and the Z-twisted cords may be buried regularly, for example, may be buried alternately. When the S-twisted cords and the Z-twisted cords are buried, the straightness of the belt can be enhanced. That is, when only the S-twisted cords or only the Z-twisted cords are buried as the core wires, the property of the belt leaning to one side of either left or right with respect to the running direction is intensified due to the untwisting torque of the core wires. When the inclined running occurs, abrasion in a frictional power-transmission face or a belt end face is accelerated, thereby reducing the durability. In contrast, when the S-twisted cords and the Z-twisted cords are buried (particularly buried to be disposed alternately), the untwisting torques of the core wires cancel each other to thereby enhance the straightness of the belt. Thus, the durability such as pop-out resistance can be improved.

[Frictional Power-Transmission Belt]

Figure 1:
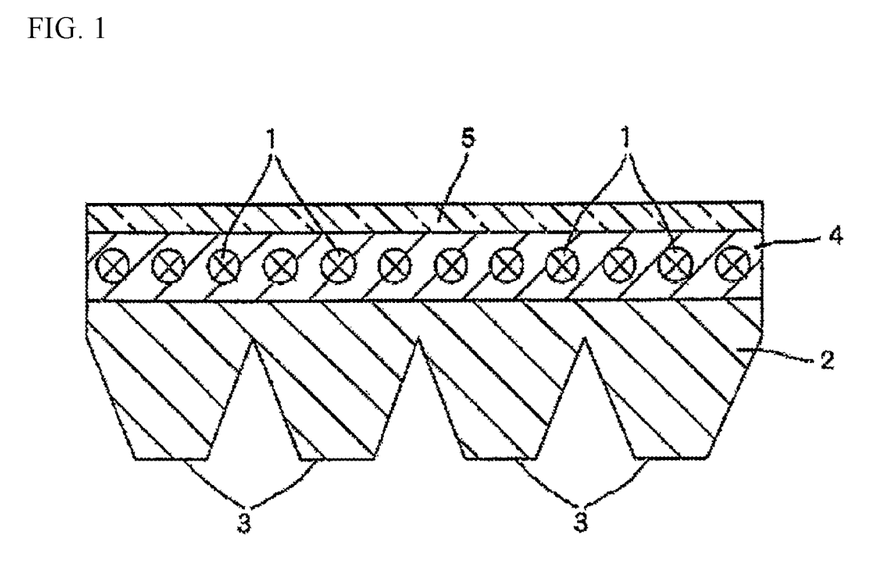
FIG. 1 is a schematic sectional view illustrating an example of a frictional power-transmission belt (V-ribbed belt) of the present invention.

The details of the frictional power-transmission belt of the present invention will be described below along a V-ribbed belt byway of example. The form of the V-ribbed belt of the present invention is not particularly limited as long as it includes a plurality of V-rib portions extending in parallel with one another along the longitudinal direction of the belt. An example of the form is shown in FIG. 1. FIG. 1 is a schematic sectional view (sectional view cut along the belt width direction) illustrating an example of the frictional power-transmission belt (V-ribbed belt) of the present invention. The V-ribbed belt shown in FIG. 1 has a form in which a compression rubber layer 2, an adhesion rubber layer 4 having core wires 1 buried in the longitudinal direction of the belt, and a tension layer 5 formed of a cover fabric (woven fabric, knitted fabric, nonwoven fabric, etc.) or a rubber composition are laminated sequentially from the belt bottom (inner circumferential surface) toward the belt top (back surface). A plurality of grooves with V-shaped section extending in the longitudinal direction of the belt are formed in the compression rubber layer 2. A plurality of V-rib portions 3 (four portions in the example shown in FIG. 1) each having a V-shape (inverted trapezoidal shape) in section are formed between the grooves. Two slopes (surfaces) of each V-rib portion 3 form frictional power-transmission faces, which is to be in contact with a pulley to transmit (frictionally transmit) power. Inside the adhesion rubber layer 4, a plurality of core wires 1 are disposed to extend in the longitudinal direction of the belt and to be separated from one another at a predetermined pitch in the belt width direction.

The form of the V-ribbed belt is not limited to this form. Any V-ribbed belt can be used as long as it includes a compression rubber layer having a power-transmission face at least a part of which can be in contact with a V-rib groove portion (V-groove portion) of a pulley. Generally, the V-ribbed belt has a tension layer, a compression rubber layer, and core wires buried therebetween along the longitudinal direction of the belt. In the V-ribbed belt of the present invention, for example, the core wires 1 may be buried between the tension layer 5 and the compression rubber layer 2 without providing the adhesion rubber layer 4. Further, the V-ribbed belt may have a form in which the adhesion rubber layer 4 is provided on either the compression rubber layer 2 or the tension layer 5, and the core wires 1 are buried between the adhesion rubber layer 4 (the compression rubber layer 2 side) and the tension layer 5 or between the adhesion rubber layer 4 (the tension layer 5 side) and the compression rubber layer 2.

Any compression rubber layer 2 can be used as long as it includes a rubber composition which will be described later in detail, any adhesion rubber layer 4 can be used as long as it includes a rubber composition which is commonly used as an adhesion rubber layer, and any tension layer 5 can be used as long as it includes a cover fabric or a rubber composition which is commonly used as a tension layer. The tension layer 5 does not have to include the same rubber composition as the compression rubber layer 2.

In the V-ribbed belt of the present invention, the number of V-ribs (rib number) is four in FIG. 1, and may be selected from a range of, for example, about 2 to 6. The present invention is greatly characterized in that the durability of the belt can be improved in spite of a small number of ribs. The number of ribs is preferably 3 to 5, and particularly preferably 4. In the present invention, when the number of ribs is set to be as small as about 3 to 5, a request to save the space and reduce the weight can be satisfied. When the number of ribs is too small, there is a concern that the tensile elastic modulus and the tensile strength are insufficient even when a carbon fiber is used. On the contrary, when the number of ribs is too large, there is a concern that the request to save the space and reduce the weight is not sufficiently satisfied.

The frictional power-transmission belt (particularly, the V-ribbed belt) of the present invention is suitable for applications where high dynamic tension is generated. For example, in an engine mounted with a belt-type ISG drive, the start of the engine where high dynamic tension is generated in the belt is frequently repeated. Therefore, the frictional power-transmission belt of the present invention is requested to have tensile strength higher than that of a general belt. In such an application, the tensile strength of the frictional power-transmission belt may be 1.5 kN/rib or more, and is, for example, about 1.5 to 10 kN/rib, preferably about 2 to 5 kN/rib, and more preferably about 2.5 to 4 kN/rib (particularly 3 to 3.5 kN/rib), as a value for one rib. When the tensile strength of the belt is adjusted within such a range, the belt can show enough durability without being cut off even when high dynamic tension acts on the belt.

The tensile elastic modulus of the frictional power-transmission belt (particularly, the V-ribbed belt) of the present invention is, for example, about 240 to 500 N/(mm·%), preferably about 250 to 480 N/(mm·%), and more preferably about 300 to 450 N/(mm·%) (particularly 350 to 400 N/(mm·%)). When the tensile elastic modulus of the belt is too small, there is a concern that the elongation of the belt increases to increase slippage, causing failure in power transmission, occurrence of abnormal sound, and deterioration in durability due to heat generation. When the tensile elastic modulus of the belt is too large, there is a concern that fluctuation of tension in the belt increases to deteriorate the durability.

In the present description, the tensile strength and the tensile elastic modulus of the frictional power-transmission belt are measured by the methods described in Examples which will be described later.

The engine mounted with a belt-type ISG drive to which the frictional power-transmission belt (particularly the V-ribbed belt) of the present invention is suitably applied may be, for example, an engine in which dynamic tension per 1 mm width of the belt of 85 N/mm or more (e.g., about 90 to 120 N/mm) is generated. Under such severe conditions, the frictional power-transmission belt (particularly the V-ribbed belt) of the present invention can show its own advantageous effect more effectively. The engine mounted with a belt-type ISG drive may be an engine mounted with a belt-type ISG drive including a tensioner at the back surface of the belt.

The frictional power-transmission belt (particularly the V-ribbed belt) of the present invention has high durability and excellent power-transmission performance in spite of the small width of the belt. Therefore, the belt width (average width) is not particularly limited and can be selected from the range of about 5 to 100 mm depending on the type of the belt. For example, the belt width is about 5 to 50 mm, preferably about 8 to 30 mm, and more preferably about 10 to 20 mm. In particular, in the V-ribbed belt of the present invention, the durability of the belt can be improved with a small number of ribs, and thus the width of the belt may be narrow. The width (average width) of the V-ribbed belt is, for example, about 7 to 22 mm, preferably about 10 to 18 mm, and more preferably about 12 to 16 mm.

(Rubber Composition)

The compression rubber layer 2, the adhesion rubber layer 4, and the tension layer 5 may be formed of a rubber composition containing a rubber component. Particularly when the compression rubber layer is formed of a rubber composition, excellent calmness and power-transmission performance can be provided to the belt. Further, when the compression rubber layer and the adhesion rubber layer are formed of a rubber composition, the adhesion treatment with the core wires can be performed by use of an existing method.

Vulcanizable or crosslinkable rubber may be used as the rubber component. Examples of such rubber component include diene-based rubbers (a natural rubber, an isoprene rubber, a butadiene rubber, a chloroprene rubber, a styrene-butadiene rubber (SBR), an acrylonitrile butadiene rubber (nitrile rubber), a hydrogenated nitrile rubber, etc.), an ethylene-α-olefin elastomer, a chlorosulfonated polyethylene rubber, an alkylated chlorosulfonated polyethylene rubber, epichlorohydrin rubber, an acrylic rubber, a silicone rubber, a urethane rubber, and a fluorine rubber. Each of those rubber components may be used alone, or two or more kinds of them may be used in combination. The ethylene-α-olefin elastomer (ethylene-propylene copolymer (EPM), ethylene-propylene-diene terpolymer (EPDM), etc.) and the chloroprene rubber are preferred rubber components. Further, the ethylene-α-olefin elastomer (ethylene-propylene copolymer (EPM) and the ethylene-propylene-diene terpolymer (EPDM), etc.) are particularly preferred from the viewpoints of having ozone resistance, heat resistance, cold resistance and weather resistance and reducing the weight of the belt. When the rubber component includes the ethylene-α-olefin elastomer, the proportion of the ethylene-α-olefin elastomer in the rubber component may be 50 mass % or more (particularly about 80 to 100 mass %), and particularly preferably 100 mass % (only the ethylene-α-olefin elastomer).

The rubber composition may further include a staple fiber. Examples of the staple fiber include: a synthetic fiber such as a polyolefin-based fiber (a polyethylene fiber, a polypropylene fiber, etc.), a polyamide fiber (a polyamide-6 fiber, a polyamide-66 fiber, a polyamide-46 fiber, an aramid fiber, etc.), a polyalkylene arylate-based fiber (e.g., a $C_{2-4}$ alkylene $C_{8-14}$ arylate-based fiber such as a polyethylene terephthalate (PET) fiber, a polytrimethylene terephthalate (PTT) fiber, a polybutylene terephthalate (PBT) fiber, and a polyethylene naphthalate (PEN) fiber), a vinylon fiber, a polyvinyl alcohol-based fiber, and a poly-para-phenylene benzobisoxazole (PBO) fiber; a natural fiber such as cotton, hemp, and wool; and an inorganic fiber such as a carbon fiber. Each of those staple fibers may be used alone, or two or more kinds of them may be used in combination. The staple fiber may be subjected to an adhesion treatment (or surface treatment) used commonly, in the same manner as the core wire, in order to improve dispersibility and adhesive property in the rubber composition.

Particularly when the frictional power-transmission belt (particularly the V-ribbed belt) of the present invention is used in applications where high dynamic tension is generated, it is preferable that the compression rubber layer and the tension layer contain staple fibers in order to prevent the abrasion of the rubber and to improve the durability against the high dynamic tension, and it is particularly preferable that the staple fibers protrude from the surfaces of the compression rubber layer and the tension layer (particularly the compression rubber layer). Examples of a method for making the staple fibers protrude from the surface of the compression rubber layer include a method of burying the staple fibers into the compression rubber layer in a state where the staple fibers protrude from the surface of the compression rubber layer, and a method of planting the staple fibers into the surface of the compression rubber layer. In the frictional power-transmission belt (particularly the V-ribbed belt) including the compression rubber layer and the tension layer (particularly the compression rubber layer) with the staple fibers protruding from the surfaces thereof, the abrasion resistance of the compression rubber layer can be enhanced so that the durability can be prevented from deteriorating due to the abrasion of the compression rubber layer before a damage occurs due to bending fatigue or peeling.

The rubber composition may further include additives used commonly. Examples of the commonly used additives include a vulcanizing agent or a crosslinking agent (or a crosslinking agent based additive) (a sulfur-based vulcanizing agent or the like), a co-crosslinking agent (bismaleimides, etc.), a vulcanization aid or a vulcanization accelerator (a thiuram-based accelerator or the like), a vulcanization retarder, metal oxide (zinc oxide, magnesium oxide, calcium oxide, barium oxide, iron oxide, copper oxide, titanium oxide, aluminum oxide, etc.), a reinforcing agent (e.g., carbon black, white carbon, or silicon oxide such as water-containing silica), a filler (clay, calcium carbonate, talc, mica, etc.), a softener (e.g., oils such as paraffin oil or naphthenic oil), a processing agent or a processing aid (stearic acid, metal salt of stearic acid, wax, paraffin, fatty acid amide, etc.), an anti-aging agent (an antioxidant, an anti-heat aging agent, a bending-crack inhibitor, an ozone-deterioration inhibitor, etc.), a coloring agent, a tackifier, a plasticizer, a coupling agent (a silane coupling agent, etc.), a stabilizer (an ultraviolet absorber, a heat stabilizer, etc.), a flame retardant, and an antistatic agent. Each of those additives may be used alone, or two or more kinds of them may be used in combination. The metal oxide may act as a crosslinking agent. In addition, particularly the rubber composition constituting the adhesion rubber layer 4 may contain an adhesive property improver (resorcin-formaldehyde co-condensate, amino resin, etc.).

The rubber compositions constituting the compression rubber layer 2, the adhesion rubber layer 4, and the tension layer 5 may be the same as one another or may be different from one another. In the same manner, the staple fibers or additives contained in the compression rubber layer 2, the adhesion rubber layer 4, and the tension layer 5 may be the same as one another or may be different from one another.

(Cover Fabric)

The tension layer 5 may be formed of a cover fabric. The cover fabric can be, for example, formed of a fabric material (preferably woven fabric) such as woven fabric, wide-angle fabric, knitted fabric, and nonwoven fabric. If necessary, an adhesion treatment such as a treatment with an RFL liquid (such as immersion treatment) or friction for rubbing adhesion rubber into the fabric material may be performed, or the adhesion rubber and the fabric material may be laminated (coated) on each other and then laminated on the compression rubber layer and/or the adhesion rubber layer in the above form.

The tension layer 5 may be a tension layer in which a surface of a rubber layer is covered with cloth (such as the cover fabric). Such a tension layer is preferably applied to an engine mounted with a belt-type ISG drive including a tensioner at the back surface of the belt. As the tension layer to be applied to the engine mounted with a belt-type ISG drive including a tensioner, a tension layer containing a staple fiber or a tension layer whose surface is covered with cloth and which contains a staple fiber is also preferred as well as the tension layer whose surface is covered with cloth. When such a tension layer is applied, it is possible to improve the durability even in the belt-type ISG drive including a tensioner in which abrasion resistance is also required in the tension rubber layer.

[Method of Manufacturing Frictional Power-Transmission Belt]

A known or commonly used method can be used for manufacturing the frictional power-transmission belt of the present invention as long as the core wire of the present invention is buried in a rubber layer in place of a conventional core wire. That is, the frictional power-transmission belt can be manufactured through a step of forming, into a predetermined shape, a rubber layer or sheet (such as a laminate or a laminated sheet including an adhesion rubber layer) formed of an unvulcanized rubber composition and having the core wire buried therein, and a step of vulcanizing the formed body. After the vulcanizing step, the vulcanized formed may be processed by a processing step (a processing step of cutting, rib-forming, etc.). For example, the frictional power-transmission belt may be manufactured by burying the core wire in the rubber layer, forming the rubber layer into a cylindrical shape by a forming mold, vulcanizing the rubber layer to form a sleeve, and then cutting the sleeve into a predetermined width. For example, among frictional power-transmission belts, the V-ribbed belt can be formed by forming the compression rubber layer 2, the adhesion rubber layer 4 with the core wire 1 buried therein, and the tension layer 5 respectively with unvulcanized rubber compositions, and laminating the above layers; forming the laminated body into a cylindrical shape by a forming mold and vulcanizing the same to form a sleeve; and cutting the vulcanized sleeve into a predetermined width. More in detail, the V-ribbed belt can be manufactured in the following method.

(First Manufacturing Method)

First, a sheet for the tension layer is wound around a cylindrical forming mold (mold or forming mold) having a smooth surface. A core wire (twisted cord) forming a core body is spun spirally on the sheet. A sheet for the adhesion rubber layer and a sheet for the compression rubber layer are further wound thereon sequentially to prepare a formed body. Thereafter, the forming mold in a state where the formed body is covered with a vulcanizing jacket is put into a vulcanizer to perform vulcanization under predetermined vulcanizing conditions. Then, the formed body is released from the forming mold to obtain a cylindrical vulcanized rubber sleeve. The external surface (compression rubber layer) of the vulcanized rubber sleeve is ground with a grinding wheel to form a plurality of ribs. The vulcanized rubber sleeve is then cut in the longitudinal direction of the belt with a predetermined width by a cutter to thereby obtain a V-ribbed belt. When the belt cut thus is reversed, a V-ribbed belt including a compression rubber layer having rib portions in an inner circumferential surface thereof is obtained.

(Second Manufacturing Method)

First, using a cylindrical inner mold with a flexible jacket attached to an outer circumferential surface thereof as an inner mold, a sheet for the tension layer is wound around the flexible jacket on the outer circumferential surface. A core wire for forming a core body is spun spirally on the sheet. Further, a sheet for the compression rubber layer is wound thereon to prepare a laminate. Next, a cylindrical outer mold provided with a plurality of rib molds in an inner circumferential surface thereof is used as an outer mold which can be attached to the inner mold, and the inner mold on which the laminate is wound is disposed concentrically within the outer mold. Thereafter, the flexible jacket is expanded toward the inner circumferential surface (rib molds) of the outer mold, and the laminate (compression rubber layer) is pressed into the rib molds and vulcanized. Then, the inner mold is taken out from the outer mold, and a vulcanized rubber sleeve having a plurality of ribs is released from the outer mold. The vulcanized rubber sleeve is then cut in the longitudinal direction of the belt a predetermined width by a cutter to thereby obtain a V-ribbed belt. According to the second manufacturing method, the laminate including the tension layer, the core body, and the compression rubber layer can be expanded at one time to thereby obtain a sleeve (or a V-ribbed belt) having a plurality of ribs.

(Third Manufacturing Method)

In relation to the second manufacturing method, for example, a method disclosed in JP-A-2004-82702 (a method in which only a compression rubber layer is expanded to prepare a preliminary formed body (semi-vulcanized state), and next a tension layer and a core body are expanded to be pressed and attached onto the preliminary formed body so as to be vulcanized and integrated, thereby obtaining a V-ribbed belt) may be used.

EXAMPLES

Hereinafter, the present invention will be described in more detail based on Examples, but the present invention is not limited to these Examples. The details of raw materials and treatment liquids used in Examples and the evaluation method for the measured evaluation items are shown below.

[Raw Yarn]

Carbon 1: carbon fibers, "TORAYCA (registered trademark) T400HB-3000" manufactured by Toray Industries, Inc., tensile elastic modulus: 230 GPa, single yarn fineness: 0.67 dtex, number of filaments: 3,000, fineness: 200 tex Carbon 2: carbon fibers, "TORAYCA (registered trademark) T400HB-6000" manufactured by Toray Industries, Inc., tensile elastic modulus: 230 GPa, single yarn fineness: 0.67 dtex, number of filaments: 6,000, fineness: 400 tex Carbon 3: carbon fibers, "TORAYCA (registered trademark) T700SC-12000" manufactured by Toray Industries, Inc., tensile elastic modulus: 230 GPa, single yarn fineness: 0.67 dtex, number of filaments: 12,000, fineness: 800 tex

[Adhesion Treatment Liquid]

An aqueous mixed liquid containing carboxyl-modified hydrogenated nitrile rubber latex as a main component, and containing 25 parts by mass/100 parts by mass (phr) of 4,4'-bismaleimide diphenylmethane and 25 parts by mass/100 parts by mass (phr) of blocked polyisocyanate by solid content diluted with water was used as the adhesion treatment liquid. Depending on the difference in dilution concentration with water, three types of adhesion treatment liquids were used: an adhesion treatment liquid 1 having a total solid content concentration of 11 mass %, an adhesion treatment liquid 2 having a total solid content concentration of 20 mass %, and an adhesion treatment liquid 3 having a total solid content concentration of 28 mass %.

[Overcoat Treatment Liquid]

A toluene-diluted solution of adhesive agent "CHEMLOK 233X" manufactured by Lord Corporation, having a solid content concentration of 10 mass %.

[Raw Materials Constituting Belt]

EPDM: "NORDEL (registered trademark) IP3640" manufactured by DuPont Dow Elastomer Japan. Mooney viscosity: 40 (100° C.)

Carbon black HAF: "SEAST (registered trademark) 3" manufactured by Tokai Carbon Co., Ltd.

Water-containing silica: "Nipsil (registered trademark) VN3" manufactured by Tosoh Silica Corporation, BET specific surface area: 240 m$^2$/g Resorcin-formaldehyde condensate: "Sumikanol 620" manufactured by Taoka Chemical Co., Ltd.

Anti-aging agent: "NONFLEX (registered trademark) OD3" manufactured by Seiko Chemical Co., Ltd.

Vulcanization accelerator DM: di-2-benzothiazolyl disulfide

Polyamide staple fiber: "NYLON-66" manufactured by Asahi Kasei Corporation

Paraffin-based softener: "DIANA (registered trademark) PROCESS OIL" manufactured by Idemitsu Kosan Co., Ltd.

Organic peroxide: "PERKADOX (registered trademark) 14RP" manufactured by KAYAKU AKZO CO., LTD.

[Tensile Strength]

The obtained V-ribbed belt was pulled under the conditions of a pulling rate of 50 mm/min and a test temperature of 23° C. by use of a universal testing machine ("UH-200kNX" manufactured by Shimadzu Corporation) to thereby measure strength (tensile strength) at the time of breaking of the V-ribbed belt.

[Tensile Elastic Modulus]

A pair of flat pulleys (diameter: 75 mm) were attached to a lower fixation portion and an upper load cell coupling portion of an autograph ("AGS-J10 kN" manufactured by Shimadzu Corporation), and the V-ribbed belt was wound on the flat pulleys such that the back surface side of the V-ribbed belt abutted against the flat pulleys. Next, the upper flat pulley was moved up to apply stress (about 14 N/mm) so as not to loosen the V-ribbed belt. The position of the upper flat pulley in this state was regarded as an initial position. The upper flat pulley was then moved up at a rate of 50 mm/min. Immediately after the stress on the V-ribbed belt reached 170 N/mm, the upper flat pulley was moved down and returned to the initial position. Such an up and down from the initial position was repeated again. In a stress-strain curve obtained in the second measurement, an inclination (average inclination) of a straight line in a region (85 to 140 N/mm) having a comparatively linear relationship was calculated as the tensile elastic modulus of the V-ribbed belt.

[Durability Running Test (Running Life)]

Figure 2:
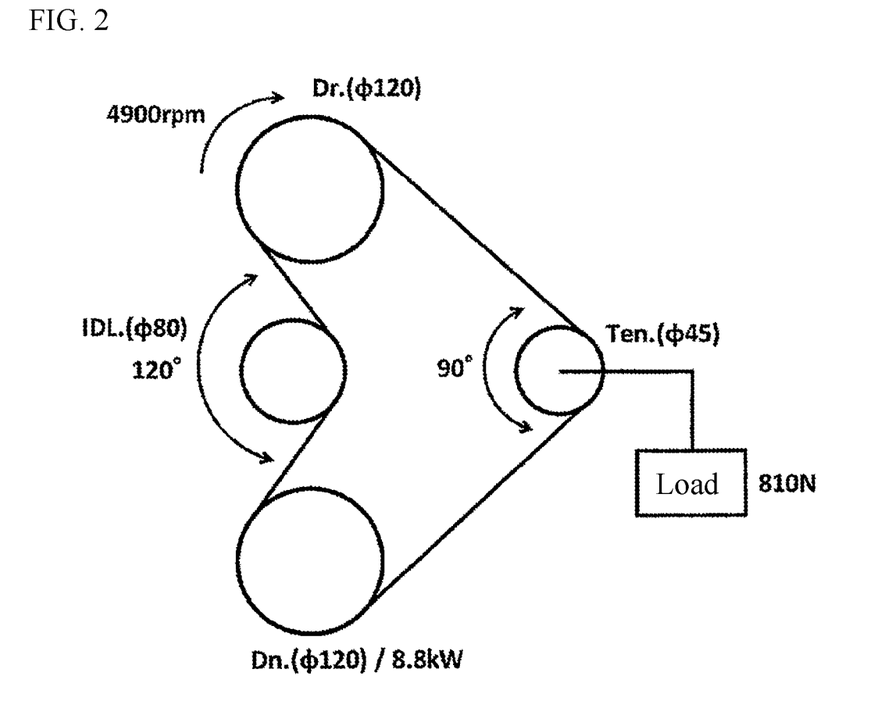
FIG. 2 is a schematic diagram illustrating a testing machine for evaluating a durability running test on V-ribbed belts obtained in Examples and Comparative Examples.

Durability running test was performed by using a testing machine having a layout illustrated in FIG. 2 in which a driving pulley (Dr.) having a diameter of 120 mm, a tension pulley (Ten.) having a diameter of 45 mm, a driven pulley (Dn.) having a diameter 120 mm, and an idler pulley (IDL.) having a diameter of 80 mm were disposed in order. The V-ribbed belt was suspended on each pulley of the testing machine, and driven to run under the following conditions.

That is, the rotating speed of the driving pulley was 4,900 rpm, the belt was wound on the idler pulley at a winding angle of 120°, the belt was wound on the tension pulley at a winding angle of 90°, a load on the driven pulley was 8.8 kW, a fixed load (810 N) was given to the belt, and an atmospheric temperature was 120° C. Then, the belt was made to run up to 200 hours. The belt after the running was observed visually and observed with a microscope, and it was checked whether a defect such as peeling, breakage or pop-out was generated. When there was no defect in the belt, the belt was determined as no problem as to durability. When a defect was observed, the defect was written in Table 3. When the belt did not break down during 200 hours, it was determined to have a running life of 200 hours or longer, and when the belt broken down within 200 hours, the time when the belt broken was determined to be its life and the test was terminated. Further, a tensile test after running was performed to measure the residual tensile strength. For the broken belt, the residual tensile strength was measured for the unbroken portion.

[Preparation of Core Wire]

Example 1

First, Carbon Fiber 1 having a fineness of 200 tex was immersed into the adhesion treatment liquid 2 for 10 seconds and then dried at 150° C. for 2 minutes to prepare an adhesion-treated yarn (core yarn). The solid content adhesion rate was 18 mass %. Then, the obtained adhesion-treated yarn was first-twisted in the S direction at the number of twists of 30 twists/m to prepare a first-twisted yarn. Subsequently, two first-twisted yarns were combined and second-twisted in the S direction at the number of twists of 105 twists/m to prepare a Lang lay yarn (S-twisted cord) having a total fineness of 400 tex. On the other hand, a Z-twisted cord was also prepared in the same manner except that the twisting direction of the first-twist and the second-twist was the Z direction. The obtained S-twisted cord and Z-twisted cord were immersed in the overcoat treatment liquid for 5 seconds and then dried at 100° C. for 3 minutes to prepare treated cords (diameter: 0.77 mm).

Example 2

A treated cord having a total fineness of 600 tex and a diameter of 0.92 mm was prepared in the same manner as in Example 1 except that three first-twisted yarns were combined and the number of second-twists was 85 twists/m.

Example 3

A treated cord having a total fineness of 600 tex and a diameter of 0.94 mm was prepared in the same manner as in Example 2 except that the number of second-twists was 120 twists/m.

Example 4

A treated cord having a total fineness of 600 tex and a diameter of 0.95 mm was prepared in the same manner as in Example 3 except that the number of first-twists was 60 twists/m.

Example 5

A treated cord having a total fineness of 600 tex and a diameter of 0.95 mm was prepared in the same manner as in Example 2 except that the number of first-twists was 90 twists/m and the number of second-twists was 75 twists/m.

Example 6

First, Carbon Fiber 2 having a fineness of 400 tex was immersed into the adhesion treatment liquid 1 for 10 seconds and then dried at 150° C. for 2 minutes to prepare an adhesion-treated yarn. The solid content adhesion rate was 10 mass %. Then, the obtained adhesion-treated yarn was first-twisted in the S direction at the number of twists of 30 twists/m to prepare a first-twisted yarn. Subsequently, two first-twisted yarns were combined and second-twisted in the S direction at the number of twists of 75 twists/m to prepare a Lang lay yarn (S-twisted cord) having a total fineness of 800 tex. On the other hand, a Z-twisted cord was also prepared in the same manner except that the twisting direction of the first-twist and the second-twist was the Z direction. The obtained S-twisted cord and Z-twisted cord were immersed in the overcoat treatment liquid for 5 seconds and then dried at 100° C. for 3 minutes to prepare treated cords (diameter: 1.07 mm).

Example 7

A treated cord having a total fineness of 800 tex and a diameter of 1.10 mm was prepared in the same manner as in Example 6 except that the adhesion treatment liquid 2 was used instead of the adhesion treatment liquid 1. The solid content adhesion rate was 18 mass %.

Example 8

A treated cord having a total fineness of 800 tex and a diameter of 1.16 mm was prepared in the same manner as in Example 6 except that the adhesion treatment liquid 3 was used instead of the adhesion treatment liquid 1. The solid content adhesion rate was 25 mass %.

Example 9

A treated cord having a total fineness of 800 tex and a diameter of 1.14 mm was prepared in the same manner as in Example 7 except that the number of first-twists was 45 twists/m and the number of second-twists was 105 twists/m.

Example 10

A treated cord having a total fineness of 800 tex and a diameter of 1.10 mm was prepared in the same manner as in Example 1 except that four first-twisted yarns were combined and the number of first-twists was 60 twists/m.

Comparative Example 1

First, Carbon Fiber 1 having a fineness of 200 tex was immersed into the adhesion treatment liquid 2 for 10 seconds and then dried at 150° C. for 2 minutes to prepare an adhesion-treated yarn. The solid content adhesion rate was 18 mass %. Then, the obtained adhesion-treated yarn was twisted in the S direction at the number of twists of 120 twists/m to prepare a single-twisted yarn (S-twisted cord) having a total fineness of 200 tex. On the other hand, a Z-twisted cord was also prepared in the same manner except that the twisting direction was the Z direction. The obtained S-twisted cord and Z-twisted cord were immersed in the overcoat treatment liquid for 5 seconds and then dried at 100° C. for 3 minutes to prepare treated cords (diameter: 0.50 mm).

Comparative Example 2

A treated cord having a total fineness of 400 tex and a diameter of 0.77 mm was prepared in the same manner as in Comparative Example 1 except that Carbon Fiber 2 having a fineness of 400 tex was used as the raw yarn and the number of twists was 85 twists/m.

Comparative Example 3

A treated cord having a fineness of 800 tex and a diameter of 1.07 mm was prepared in the same manner as in Comparative Example 1 except that Carbon Fiber 3 having a fineness of 800 tex was used as the raw yarn and the number of twists was 60 twists/m.

Comparative Example 4

A treated cord having a total fineness of 1,200 tex and a diameter of 1.33 mm was prepared in the same manner as in Example 7 except that three first-twisted yarns were combined and the number of second-twists was 60 twists/m.

Comparative Example 5

A treated cord having a total fineness of 800 tex and a diameter of 1.05 mm was prepared in the same manner as in Example 7 except that the obtained S-twisted cord and Z-twisted cord were not immersed in the overcoat treatment liquid.

Comparative Example 6

First, Carbon Fiber 2 having a fineness of 400 tex was immersed into the adhesion treatment liquid 2 for 10 seconds and then dried at 150° C. for 2 minutes to prepare an adhesion-treated yarn. The solid content adhesion rate was 18 mass %. Then, the obtained adhesion-treated yarn was first-twisted in the S direction at the number of twists of 30 twists/m to prepare a first-twisted yarn. Subsequently, two first-twisted yarns were combined and second-twisted in the Z direction at the number of twists of 75 twists/m to prepare a first plied cord having a total fineness of 800 tex. On the other hand, a second plied cord was also prepared in the same manner except that the twisting direction of the first-twist was the Z direction and twisting direction of the second-twist was the S direction. The obtained first twisted cord and second twisted cord were immersed in the overcoat treatment liquid for 5 seconds and then dried at 100° C. for 3 minutes to prepare treated cords (diameter: 1.12 mm).

[Preparation of V-Ribbed Belt]

First, a single ply (single layer) of cotton fabric with rubber was wound around the outer circumference of a cylindrical forming mold having a smooth surface, and an unvulcanized sheet for an adhesion rubber layer, which was formed of a rubber composition shown in Table 1, was wound around the outside of the cotton fabric. Next, in the state where the S-twisted treated cord and the Z-twisted treated cord were arranged in parallel at a predetermined pitch shown in Table 3, two treated cords (the S-twisted treated cord and the Z-twisted treated cord; and treated cords of the first plied cord and second plied cord in Comparative Example 6) obtained in Examples 1 to 10 and Comparative Examples 1 to 6 were spirally spun and wound on the sheet for the adhesion rubber layer. Further, an unvulcanized sheet for an adhesion rubber layer formed of the rubber composition and an unvulcanized sheet for a compression rubber layer formed of a rubber composition shown in Table 2 were wound sequentially thereon. In the state where a vulcanizing jacket was disposed outside the sheet for the compression rubber layer, the forming mold was put into a vulcanizer, and then vulcanized. A cylindrical vulcanized rubber sleeve obtained by the vulcanization was released from the forming mold. The compression rubber layer of the vulcanized rubber sleeve was ground with a grinder to form a plurality of V-shaped grooves concurrently. The cylindrical vulcanized rubber sleeve was then cut circumferentially into a round slice by a cutter. Thus, a V-ribbed belt having three ribs formed therein and having a circumferential length of 1,100 mm and an average width of 10.7 mm was obtained. In the obtained belt, the S-twisted treated cord and the Z-twisted treated cord (in Comparative Example 6, treated cords of the first plied cord and second plied cord) were arranged alternately in parallel in a sectional view in the direction illustrated in FIG. 1.

TABLE 1

(composition for adhesion rubber layer)

| Component | Part by mass |
|---|---|
| EPDM | 100 |
| Stearic acid | 1 |
| Zinc oxide | 5 |
| Carbon HAF | 35 |
| Water-containing silica | 20 |
| Resorcin-formaldehyde condensate | 2 |
| Anti-aging agent | 2 |
| Vulcanization accelerator DM | 2 |
| Hexamethoxy methylol melamine | 2 |
| Sulfur | 1 |
| Total | 170 |

TABLE 2

(composition for compression rubber layer)

| Component | Part by mass |
|---|---|
| EPDM | 100 |
| Polyamide staple fiber | 15 |
| Cotton staple fiber | 25 |
| Zinc oxide | 5 |
| Stearic acid | 1 |
| Mercaptobenzimidazole | 1 |
| Carbon HAF | 60 |
| Paraffin-based softener | 10 |
| Organic peroxide | 4 |
| Dibenzoyl-quinone dioxime | 2 |
| Total | 223 |

The evaluation results of the obtained V-ribbed belt are shown in Table 3.

TABLE 3

| | | Example | | | | | | | | | |
|---|---|---|---|---|---|---|---|---|---|---|---|
| | | 1 | 2 | 3 | 4 | 5 | 6 | 7 | 8 | 9 | 10 |
| Twisting method | | Lang lay | Lang lay | Lang lay | Lang lay | Lang lay | Lang lay | Lang lay | Lang lay | Lang lay | Lang lay |
| Type of raw yarn | | Carbon | Carbon | Carbon | Carbon | Carbon | Carbon | Carbon | Carbon | Carbon | Carbon |
| Fineness of raw yarn | (tex) | 200 | 200 | 200 | 200 | 200 | 400 | 400 | 400 | 400 | 200 |
| Twist form | | 1 × 2 | 1 × 3 | 1 × 3 | 1 × 3 | 1 × 3 | 1 × 2 | 1 × 2 | 1 × 2 | 1 × 2 | 1 × 4 |
| Total fineness | (tex) | 400 | 600 | 600 | 600 | 600 | 800 | 800 | 800 | 800 | 800 |
| Twist coefficient | First-twist | 0.5 | 0.5 | 0.5 | 1.0 | 1.5 | 0.7 | 0.7 | 0.7 | 1.0 | 1.0 |
| | Second-twist | 2.5 | 2.5 | 3.5 | 3.5 | 2.2 | 2.5 | 2.5 | 2.5 | 3.5 | 3.5 |
| | Second-twist/first-twist | 5.0 | 5.0 | 7.0 | 3.5 | 1.5 | 3.6 | 3.6 | 3.6 | 3.5 | 3.5 |
| Number of twists | First-twist (twists/m) | 30 | 30 | 30 | 60 | 90 | 30 | 30 | 30 | 45 | 60 |
| | Second-twist (twists/m) | 105 | 85 | 120 | 120 | 75 | 75 | 75 | 75 | 105 | 105 |
| Solid content adhesion rate | (%) | 18 | 18 | 18 | 18 | 18 | 10 | 18 | 25 | 18 | 18 |
| Overcoat | | Yes | Yes | Yes | Yes | Yes | Yes | Yes | Yes | Yes | Yes |
| Cord diameter | (mm) | 0.77 | 0.92 | 0.94 | 0.95 | 0.95 | 1.07 | 1.10 | 1.16 | 1.14 | 1.10 |
| Core wire pitch | (mm) | 0.90 | 1.05 | 1.05 | 1.05 | 1.05 | 1.20 | 1.20 | 1.30 | 1.30 | 1.20 |
| Belt elastic modulus | (N/mm · %) | 310 | 340 | 300 | 260 | 330 | 370 | 360 | 300 | 250 | 340 |
| Belt tensile strength | (kN/rib) | 2.7 | 3.1 | 2.9 | 2.8 | 2.6 | 3.3 | 3.2 | 2.6 | 2.6 | 3.0 |
| High-load durability test | | | | | | | | | | | |
| Running time | (hour) | 200 | 200 | 200 | 200 | 200 | 200 | 200 | 200 | 200 | 200 |
| Problem | | No | No | No | No | No | No | No | No | No | No |
| Residual tensile strength | (kN/rib) | 2.4 | 2.6 | 2.5 | 2.5 | 2.3 | 2.0 | 2.8 | 2.4 | 2.4 | 2.2 |

| | | Comparative Example | | | | | |
|---|---|---|---|---|---|---|---|
| | | 1 | 2 | 3 | 4 | 5 | 6 |
| Twisting method | | Single twisting | Single twisting | Single twisting | Lang lay | Lang lay | Plied |
| Type of raw yarn | | Carbon | Carbon | Carbon | Carbon | Carbon | Carbon |
| Fineness of raw yarn | (tex) | 200 | 400 | 800 | 400 | 400 | 400 |
| Twist form | | 1 × 1 | 1 × 1 | 1 × 1 | 1 × 3 | 1 × 2 | 1 × 2 |
| Total fineness | (tex) | 200 | 400 | 800 | 1200 | 800 | 800 |
| Twist coefficient | First-twist | 2.0 | 2.0 | 2.0 | 0.7 | 0.7 | 0.7 |
| | Second-twist | — | — | — | 2.5 | 2.5 | 2.5 |
| | Second-twist/first-twist | — | — | — | 3.6 | 3.6 | 3.6 |
| Number of twists | First-twist (twists/m) | 120 | 85 | 60 | 30 | 30 | 30 |
| | Second-twist (twists/m) | | | | 60 | 75 | 75 |
| Solid content adhesion rate | (%) | 18 | 18 | 18 | 18 | 18 | 18 |
| Overcoat | | Yes | Yes | Yes | Yes | No | Yes |
| Cord diameter | (mm) | 0.50 | 0.77 | 1.07 | 1.33 | 1.05 | 1.12 |
| Core wire pitch | (mm) | 0.70 | 0.90 | 1.20 | 1.50 | 1.20 | 1.20 |
| Belt elastic modulus | (N/mm · %) | 210 | 280 | 340 | 370 | 360 | 380 |
| Belt tensile strength | (KN/rib) | 1.9 | 2.5 | 3.0 | 3.3 | 3.2 | 3.1 |
| High-load durability test | | | | | | | |
| Running time | (hour) | 140 | 200 | 200 | 50 | 24 | 200 |
| Problem | | Broken | No | No | Pop-out | Pop-out | Broken |
| Residual tensile strength | (kN/rib) | 1.0 | 1.5 | 1.9 | 2.4 | 2.9 | 1.0 |

As is clear from the results in Table 3, in Examples 1 to 10 in which the twisting method is Lang lay, no problem occurs in the high-load durability test of 200 hours and the residual tensile strength is higher than all of those in Comparative Examples 1 to 3 in which the twisting method is single twisting and Comparative Example 6 in which the plied cord was used. From the comparison of Examples 1, 2 and 7, it is confirmed that the belt elastic modulus, the belt tensile strength, and the residual tensile strength all increase as the fineness increases up to a total fineness of about 800, and good results are obtained. From the comparison of Examples 2 to 5, the belt elastic modulus and the residual tensile strength are influenced by changes in the number of twists (twist coefficient), and Example 2 in which the second-twist coefficient/first-twist coefficient is 5.0 shows good results. From the comparison of Examples 6 to 8 in which the solid content adhesion rates of the adhesive component are different, when the solid content adhesion rate is too low or too high, the belt elastic modulus and the residual tensile strength decrease, and Example 7 having the solid content adhesion rate of 18 mass % shows good results. From the comparison between Examples 7 and 9 and Example 10, good results are shown even when the number of first-twisted yarns is changed while the total fineness is the same. Of these, Example 7 is excellent in all of the belt elastic modulus, the belt tensile strength, and the residual tensile strength as compared with Examples 9 and 10, and is particularly preferable.

From the comparison between Examples 1 to 10 and Comparative Examples 1 to 3 and 6, the residual tensile strength is lower in the single-twisted yarn and the plied cord, the bending resistance is low in the plied cord even at a total fineness of 800 tex, and the belt is broken in a short time. Further, from the comparison between Examples 1 to 10 and Comparative Example 4, when the total fineness is too large, the belt durability is low, and at the total fineness of 1,200 tex, pop-out (pop-out of the core wire) occurs in a short time. From the comparison between Example 7 and Comparative Example 5, the adhesive force is insufficient and pop-out occurs in a short time without the overcoat treatment.

INDUSTRIAL APPLICABILITY

A frictional power-transmission belt (such as a V-ribbed belt) of the present invention can be used as a various power-transmission belt, for example, V-ribbed belt for use in accessory drive of an automobile engine. The frictional power-transmission belt of the present invention can transmit power with a narrow belt width and is excellent in durability. Therefore, the frictional power-transmission belt of the present invention can be used particularly suitably as a V-ribbed belt for driving an engine mounted with an ISG where high dynamic tension is generated.

Although the present invention has been described above in detail and with reference to its specific embodiment, it is obvious for those in the art that various modifications or changes can be made without departing from the spirit and scope of the present invention.

The present application is based on Japanese Patent Application No. 2018-156249 filed on Aug. 23, 2018, and Japanese Patent Application No. 2019-135145 filed on Jul. 23, 2019, the contents of which are incorporated herein by reference.

REFERENCE SIGNS LIST

1 core wire
2 compression rubber layer
3 V-rib portion
4 adhesion rubber layer
5 tension layer

The invention claimed is:

1. A V-ribbed belt, comprising:
a compression rubber layer formed of a rubber composition containing a rubber component comprising an ethylene-α-olefin elastomer; and
a core wire,
wherein the V-ribbed belt has a tensile elastic modulus of 240 to 500 N/(mm·%),
wherein the core wire comprises a Lang lay cord,
the core wire has a total fineness of 300 to 1000 tex,
the core wire comprises a rubber component adhered to at least a part of a surface of the core wire,
the Lang lay cord comprises a first-twisted yarn, and
the first-twisted yarn comprises a carbon fiber.

2. The V-ribbed belt according to claim 1, wherein the first-twisted yarn has a fineness of 190 to 410 tex, and a twist coefficient of 0.5 to 2.

3. The V-ribbed belt according to claim 1, wherein a number of the first-twisted yarn in the Lang lay cord is 2 to 3, and the core wire has a core wire diameter of 0.7 to 1.2 mm.

4. The V-ribbed belt according to claim 1, wherein the core wire has a second-twist coefficient of 1 to 7 times a first-twist coefficient.

5. The V-ribbed belt according to claim 1, wherein the core wire further comprises an adhesive component present between single fibers constituting the first-twisted yarn.

6. The V-ribbed belt according to claim 5, wherein the first-twisted yarn has an adhesion rate of the adhesive component of 10 to 25 mass % with respect to a raw yarn.

7. The V-ribbed belt according to claim 1, comprising a rubber layer in which a plurality of the core wire are embedded at predetermined intervals,
wherein the plurality of the core wire comprise an S-twisted Lang lay cord and a Z-twisted Lang lay cord.

8. The frictional power transmission V-ribbed belt according to claim 1, wherein the V-ribbed belt is to be installed on an engine mounted with a belt-type ISG drive in which a dynamic tension of 85 N/mm or more is applied to the V-ribbed belt per 1 mm of a width thereof.

* * * * *